US012091816B2

(12) United States Patent
Lin et al.

(10) Patent No.: US 12,091,816 B2
(45) Date of Patent: Sep. 17, 2024

(54) ARTIFICIAL LEATHER STRUCTURE AND METHOD FOR MANUFACTURING THE SAME

(71) Applicant: SAN FANG CHEMICAL INDUSTRY CO., LTD., Kaohsiung (TW)

(72) Inventors: Chih-Yi Lin, Kaohsiung (TW);
Kuo-Kuang Cheng, Kaohsiung (TW);
Kao-Lung Yang, Kaohsiung (TW);
Wei-Jie Liao, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 0 days.

(21) Appl. No.: 17/702,124

(22) Filed: Mar. 23, 2022

(65) Prior Publication Data

US 2022/0307195 A1 Sep. 29, 2022

(30) Foreign Application Priority Data

Mar. 24, 2021 (TW) .................................. 110110709

(51) Int. Cl.
*D06N 3/00* (2006.01)
*B32B 3/26* (2006.01)
(Continued)

(52) U.S. Cl.
CPC ........... *D06N 3/0006* (2013.01); *B32B 3/266* (2013.01); *B32B 5/022* (2013.01); *B32B 5/024* (2013.01);
(Continued)

(58) Field of Classification Search
CPC ...... D06N 3/0006; D06N 3/005; D06N 3/045; D06N 2211/28; B32B 5/18; B32B 3/266; B32B 2250/03; B32B 2250/40; B32B 2262/0215; B32B 2262/0253; B32B 2262/0276; B32B 2262/0292; B32B 2266/025; B32B 2266/0264; B32B 2266/0278; B32B 2274/00;
(Continued)

(56) References Cited

U.S. PATENT DOCUMENTS

| 3,582,396 A * | 6/1971 | Konig ..................... B32B 27/00 521/64 |
| 2004/0116022 A1* | 6/2004 | Langley ............... A41D 31/102 442/268 |

(Continued)

FOREIGN PATENT DOCUMENTS

| CN | 1607291 A | 4/2005 |
| CN | 101122092 A | 2/2008 |

(Continued)

OTHER PUBLICATIONS

Polypropylene data sheet, downloaded, Plastics Material Data Sheets, copyright MatWeb (Year: 2021).*

(Continued)

*Primary Examiner* — Jennifer A Steele
(74) *Attorney, Agent, or Firm* — WPAT, P.C

(57) ABSTRACT

The present disclosure provides an artificial leather structure, comprising a woven layer, a porous elastomer layer disposed on the woven layer and a nonwoven layer disposed on the porous elastomer layer. The porous elastomer layer is adhered to the woven layer and the nonwoven layer.

8 Claims, 1 Drawing Sheet

(51) Int. Cl.
  *B32B 5/02* (2006.01)
  *B32B 5/24* (2006.01)
  *D06N 3/04* (2006.01)
  *D06N 3/08* (2006.01)

(52) U.S. Cl.
  CPC ............. *B32B 5/245* (2013.01); *D06N 3/005* (2013.01); *D06N 3/045* (2013.01); *D06N 3/08* (2013.01); *B32B 2250/40* (2013.01); *B32B 2262/0292* (2013.01); *B32B 2266/0278* (2013.01); *B32B 2307/536* (2013.01); *D06N 2211/28* (2013.01)

(58) Field of Classification Search
  CPC .......... B32B 2307/30; B32B 2307/536; B32B 5/022; B32B 5/024; B32B 5/12; B32B 5/245
  See application file for complete search history.

(56) References Cited

U.S. PATENT DOCUMENTS

| | | | |
|---|---|---|---|
| 2006/0141240 A1* | 6/2006 | Ota | B60R 13/02 428/317.1 |
| 2014/0079943 A1 | 3/2014 | Chen et al. | |
| 2016/0053434 A1 | 2/2016 | Feng et al. | |
| 2020/0354888 A1 | 11/2020 | Kim et al. | |
| 2021/0114339 A1* | 4/2021 | An | D04B 21/16 |

FOREIGN PATENT DOCUMENTS

| | | | | |
|---|---|---|---|---|
| CN | 204773829 U | | 11/2015 | |
| CN | 209492255 U | | 10/2019 | |
| CN | 110857532 A | | 3/2020 | |
| CN | 111055570 A | * | 4/2020 | |
| EP | 3608453 A1 | | 2/2020 | |
| JP | 2008302619 A | | 12/2008 | |
| KR | 19990028305 A | * | 4/1999 | |
| KR | 20090039315 A | * | 4/2009 | |
| TW | I283634 B | | 7/2007 | |
| TW | 201410470 A | | 3/2014 | |
| TW | M473300 U | | 3/2014 | |
| TW | M590527 U | | 2/2020 | |
| TW | I693154 B | | 5/2020 | |
| WO | WO-2009081927 A1 | * | 7/2009 | ............. B32B 5/022 |

OTHER PUBLICATIONS

Office Action, Cited References and Search Report dated Oct. 25, 2021 issued by the Taiwan Intellectual Property Office for the corresponding Taiwanese Patent Application No. 110110709.
English Translation of the Search Report attached to the office action dated Oct. 25, 2021 issued by the Taiwan Intellectual Property Office for the corresponding Taiwanese Patent Application No. 110110709.
English Translation (Machine Translation) of TW201410470A.
English Translation (Machine Translation) of TWI693154B.
Office action and search report issued on Sep. 1, 2022 for the corresponding European Patent Application No. 22163762.2.
China Patent Office "Office Action" Dated Apr. 19, 2023, China.
China Patent Office "Search Report" Dated Apr. 19, 2023, China.

* cited by examiner

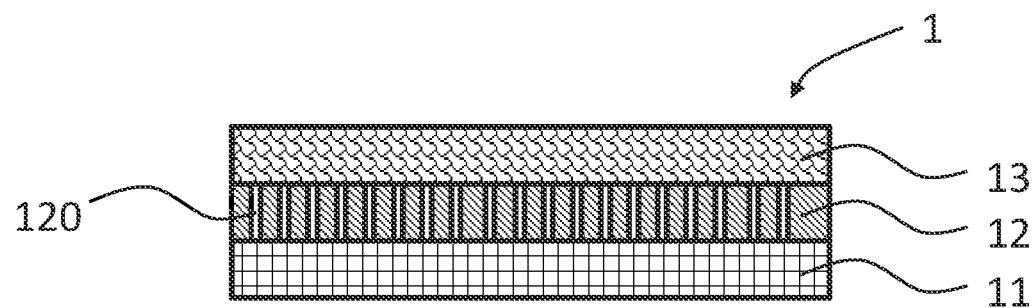

ARTIFICIAL LEATHER STRUCTURE AND METHOD FOR MANUFACTURING THE SAME

BACKGROUND

1. Field of the Disclosure

The present disclosure relates to a structure and method for manufacturing the same, and more particularly to a structure for use in artificial leather and a method for manufacturing the same.

2. Description of the Related Art

Artificial leather is very important in the textile industry, being widely used in products such as furniture and shoes.

Generally speaking, a substrate such as fabric can be impregnated with a resin such as polyurethane, and then embossed on the surface of the resin to form artificial leather. However, after impregnation, the resin fills the holes of the fabric, so that the artificial leather has poor air permeability. In addition, the resin used needs to be dissolved in organic solvents such as dimethylformamide, which is not only hazardous and toxic, but also generates a large amount of waste liquid requiring disposal after the process.

Therefore, there is an urgent need to develop a new artificial leather structure to overcome the disadvantages of the conventional artificial leather such as poor air permeability and the need for organic solvents in the manufacturing process.

SUMMARY

To address at least some of the aforementioned issues, the present disclosure provides an artificial leather structure and method for manufacturing the same. The artificial leather structure as disclosed herein has excellent air permeability and the manufacturing process is free of organic solvents.

The present disclosure provides an artificial leather structure, comprising: a woven layer;
a porous elastomer layer disposed on the woven layer and comprising a plurality of holes; and
a nonwoven layer disposed on the porous elastomer layer;
wherein the porous elastomer layer is adhered to the woven layer and the nonwoven layer.

In some embodiments of the disclosure, the woven layer contains a plurality of fibers, and the plurality of fibers are gathered to form yarn or filaments, and meridian yarn or filaments and latitude yarn or filaments cross-pass each other.

In some embodiments of the disclosure, the woven layer contains a plurality of fibers, and the plurality of fibers are gathered to form yarn or filaments, and fiber-forming yarn or filaments form loops and the loops stack and entangle together.

In some embodiments of the disclosure, the fibers of the woven layer are filaments.

In some embodiments of the disclosure, the material of the porous elastomer layer comprises a thermoplastic elastomer.

Examples of the material of the porous elastomer layer include, but are not limited to thermoplastic polyurethane (TPU), thermoplastic polyester elastomer (TPEE), and thermoplastic polyolefin (TPO).

Examples of the thermoplastic polyurethane include, but are not limited to polyester-based TPUs derived from adipic acid esters, or polyether-based TPUs based on tetrahydrofuran ether.

Examples of the thermoplastic polyester include, but are not limited to polyethylene terephthalate or polybutylene terephthalate.

Examples of the thermoplastic polyolefin include, but are not limited to polyethylene; (PE), polypropylene (PP), or propylene-ethylene copolymer.

In some embodiments of the disclosure, the melting point of the porous elastomer layer is from about 90° C. to about 130° C., from about 95° C. to about 125° C., from about 100° C. to about 120° C., or from about 105° C. to about 11.5° C.

In some embodiments of the disclosure, the Shore A hardness of the porous elastomer layer is from about 45 A to about 60 A, or from about 50 A to about 55 A.

In some embodiments of the disclosure, the plurality of holes are foam holes. Alternatively, in some embodiments of the disclosure, the plurality of holes are substantially columnar holes penetrating the porous elastomer layer.

In some embodiments of the disclosure, the material of the nonwoven layer comprises a thermoplastic elastomer.

Examples of the material of the nonwoven layer is thermoplastic polyurethane, thermoplastic polyester or thermoplastic polyolefin.

In some embodiments of the disclosure, the melting point of the nonwoven layer is from about 130° C. to about 190° C., from about 135° C. to about 185° C., from about 140° C. to about 180° C., from about 145° C. to about 175° C., from about 150° C. to about 170° C., or from about 155° C. to about 165° C.

In some embodiments of the disclosure, the Shore A hardness of the nonwoven layer is from about 50 A to about 80 A, from about 55 A to about 75 A, or from about 60 A to about 70 A.

In some embodiments of the disclosure, the nonwoven layer is melt-blown nonwoven or spun-bonded nonwoven.

In some embodiments of the disclosure, the fineness of fiber of the nonwoven layer is less than 10 μm, 9 μm, 8 μm, 7 μm, 6 μm, 5 μm, 4 μm, 3 μm, 2 μm, or 1 μm.

The present disclosure also provides a method for manufacturing the artificial leather structure as disclosed herein, comprising:

(a) providing the woven layer;

(b) providing the porous elastomer layer and disposing the porous elastomer layer on the woven layer;

(c) disposing the nonwoven layer on the porous elastomer layer; and (d) heat pressing the nonwoven layer, porous elastomer layer and woven layer for melting the porous elastomer layer and adhering the porous elastomer layer to the woven layer and nonwoven layer.

In some embodiments of the disclosure, the step (b) comprises (b1) providing an elastomer film; and (b2) forming the plurality of holes penetrating the film by drilling to obtain the porous elastomeric layer.

In some embodiments of the disclosure, the step (c) comprises forming the nonwoven layer with a melt-blown or spun-bonded process on the porous elastomer layer.

BRIEF DESCRIPTION OF THE DRAWINGS

FIG. 1 illustrates a cross-sectional view of an artificial leather structure according to a first embodiment of the present disclosure.

DETAILED DESCRIPTION

FIG. 1 illustrates a cross-sectional view of an artificial leather structure according to a first embodiment of the present disclosure. The present disclosure provides an artificial leather structure 1, comprising:
- a woven layer 11;
- a porous elastomer layer 12 disposed on the woven layer 11 and comprising a plurality of holes 120; and
- a nonwoven layer 13 disposed on the porous elastomer layer 12;
- wherein the porous elastomer layer 12 is adhered to the woven layer 11 and the nonwoven layer 13.

In one embodiment of the disclosure, the term "a woven layer" refers to fabric formed by interweaving and welding fibers. As used herein, the term "interweaving" includes but is not limited to interweaving between fibers by weaving, knitting, crocheting, or braiding. For example, using a fiber-forming meridian yarn and latitude yarn to cross-pass each other, or using a fiber-forming yarn to form loops and continuously stacking and entangling the loops together. Preferably, the interweaving is weaving or using a fiber-forming yarn to form loops and continuously stacking and entangling the loops together. Various types of machines may be applied for forming the woven base material, such as a hosiery knitter, weaving machine, circular knitting machine or horizontal knitting machine. The obtained woven base material may be of a sheet, roll or tubular. With the application of the woven layer, the physical properties and dimensional stability of the artificial leather structure according to the disclosure are greatly improved.

In some embodiments of the disclosure, the woven layer contains a plurality of fibers, and the plurality of fibers may be gathered to form yarn or filaments to facilitate interweaving. As used herein, the term "fibers" means those whose length is greater than 1000 times wider than the width. Preferably, the fibers of the woven layer are filaments, which are fibers of continuous length, for example, with a length-to-diameter ratio greater than $10^8$ or more.

In one embodiment of the disclosure, the material of the woven layer includes, but is not limited to polyurethane, polyamide, polyolefin, polymethyl methacrylate, polyethylene terephthalate (PET), polypropylene terephthalate, polybutylene terephthalate (PBT), polyacrylonitrile and mixtures thereof. Preferably, the material of the woven layer is PET or PBT.

In one embodiment of the disclosure, the material of the porous elastomer layer contains an elastomer. The porous elastomer layer comprises a plurality of holes. The plurality of holes provide air permeability to the porous elastomer layer. Therefore, the plurality of holes are preferable to penetrate through the porous elastomer layer. For example, a single hole may penetrate the porous elastomer layer, or several holes may be connected to each other and penetrate the porous elastomer layer.

In one embodiment of the disclosure, the porous elastomer layer is a foaming layer and the plurality of holes are foaming holes. In the present disclosure, the holes may be independent holes or continuous holes. The term "independent holes" as used herein refers to at least two holes which are independent and unconnected to others. The independent holes usually have circular or elliptical cross-sections, and are spherical or oval, and penetrate through the porous elastomer layer by a single hole. The term "continuous holes" as used herein refers to at least two connected holes similar to ant nests. Several continuous holes are connected to each other and together penetrate the porous elastomer layer.

In some embodiments of the disclosure, the plurality of holes are substantially columnar holes penetrating the porous elastomer layer. The term "columnar" shape is not limited to the shape with two identical end size, and the shape may be tapered to one side, being similar to a cone shape. Furthermore, there is no restriction on the cross-sectional shape of the columnar holes, which may be substantially circular or other shapes. Said columnar holes may be of the aforementioned independent holes, or may be formed by mechanical means, such as laser drilling.

In one embodiment of the disclosure, the material of the porous elastomer layer comprises a thermoplastic elastomer which can be melted and bonded to the woven layer and the non-woven layer when heated. For example, the material of the porous elastomer layer can be thermoplastic polyurethane (TPU), thermoplastic polyester elastomer (TPEE), or thermoplastic polyolefin (TPO). Examples of the thermoplastic polyurethane include, but are not limited to polyester-based TPUs derived from adipic acid esters, or polyether-based TPUs based on tetrahydrofuran ether. Examples of the thermoplastic polyesters include, but are not limited to polyethylene terephthalate or polybutylene terephthalate. Examples of the thermoplastic polyolefin include, but are not limited to polyethylene (PE), polypropylene (PP), or propylene-ethylene copolymer.

In one embodiment of the disclosure, the material of the porous elastomer comprises a thermoplastic polyurethane with a preferable melting point of about 90° C. to about 130° C., a preferable Shore A hardness of about 45 A to about 60 A, a preferable hole size of about 1.0 mm to about 5.0 mm, and a preferable set of about 100 holes to 350 holes per square inch.

The term "nonwoven layer" used in the present disclosure refers to a sheet, web or bat manufactured by directionally or randomly oriented fibers, bonded by friction, and/or cohesion and/or adhesion, excluding paper or products which are woven, knitted, tufted stitch bonded incorporating binding yarns or filaments, or felted by wet milling, whether or not additionally needled. The fibers may be man-made origin. They may be staple or continuous filaments. Depending on the method for forming the web, the nonwoven fabric usually includes composite nonwoven fabric, needle-punched nonwoven fabric, melt-blown nonwoven fabric, spun-bonded nonwoven fabric, dry-laid nonwoven fabric, wet-laid nonwoven fabric, stitch-bonded nonwoven fabric, or spun lace nonwoven fabric.

In one embodiment of the disclosure, the nonwoven layer is melt-blown nonwoven fabric or spun-bonded nonwoven fabric. Since both melt-blown nonwoven and spun-bonded nonwoven are blown out after melting the material, they can be formed directly on the porous elastomer layer and directly adhered to the porous elastomer layer. Preferably, the non-woven layer is melt-blown non-woven to further reduce its fiber fineness, and can make the surface of the non-woven with fine grain, which is closer to the feel of leather. For example, the fiber fineness of the nonwoven layer can be less than 10 μm (preferably less than 0.65 den), which can make the surface of the nonwoven layer have a water repellent effect.

In one embodiment of the disclosure, the material of the nonwoven layer comprises a thermoplastic elastomer such as the aforementioned thermoplastic polyurethane, thermoplastic polyester or thermoplastic polyolefin. Preferably, the material of the nonwoven layer is thermoplastic polyurethane with the melting point of about 130° C. to about 190° C. and the Shore A hardness of about 50 A to about 80 A. In this way, the adhesion of the nonwoven layer to the porous elastomer layer can be enhanced.

The present disclosure also provides a method for manufacturing the artificial leather structure as disclosed herein, comprising:
(a) providing the woven layer;
(b) providing the porous elastomer aver and disposing the porous elastomer layer on the woven layer;
(c) disposing the nonwoven layer on the porous elastomer layer; and
(d) heat pressing the nonwoven layer, porous elastomer layer and woven layer for melting the porous elastomer layer and adhering the porous elastomer layer to the woven layer and nonwoven layer.

In some embodiments of the disclosure, the step (b) comprises
(b1) providing an elastomer film; and
(b2) forming the plurality of holes penetrating the film by drilling to obtain the porous elastomeric layer.

In one embodiment of the disclosure, the aforementioned elastomer film may be a continuous film, i.e., the elastomer film may be intact and continuous without holes before drilling. Then, the elastomer film can be drilled by, for example, laser and other means to form a plurality of holes through the elastomeric film, so as to make the formed porous elastomer layer have permeability.

In some embodiments of the disclosure, the step (c) comprises forming the nonwoven layer with a melt-blown or spun-bonded process on the porous elastomer layer.

In one embodiment of the present disclosure, the step (b) and step (c) are integrated and sequential, allowing for rapid production.

The method as disclosed herein requires no use of organic solvents such as dimethylformamide, eliminating disadvantages of the conventional manufacturing method unfriendly to the environment and living organisms.

The following examples are given to illustrate the method for manufacturing the conjugated fiber of the present disclosure, but are not intended to limit the scope of the present invention.

Example 1

Polyester pellets with an intrinsic viscosity (IV) of 1.0 were provided and subjected to a melt-spinning and drawing process to produce a PET fiber with a strength of 6.5 g/den, an elongation of 15%, and a fineness of 150 den. The polyester fiber was then subjected to a warp knitting process to produce a warp knitted fabric with a thickness of 0.3 mm, which was used as a woven layer.

A TPU film with the melting point of 118° C., the Shore A hardness of 50 A, and a thickness of 0.2 mm was provided and drilled the film with a hole diameter of 1.6 mm and a hole distribution density of 144 holes in 1 square inch to obtain a porous elastomer layer.

TPU ester pellets with the melting point of 160° C. and the Shore A hardness of 70 A were provided and subjected to a melt-blown process to blow the TPU fiber mesh onto the porous elastomer layer to form a nonwoven layer with a fiber mesh thickness of 0.5 mm.

The aforementioned nonwoven layer and the porous elastomer layer were stacked on the woven layer, and then the three stacked layers were passed through a hot press laminating machine with the hot press temperature of 120° C. to melt and bond the porous elastomer layer to the woven layer and the nonwoven layer to obtain a thin artificial leather structure with a thickness of 0.65 mm, which is breathable and has a micro touch surface.

Example 2

Polyester pellets with an intrinsic viscosity (IV) of 0.76 were provided and subjected to a melt-spinning and drawing process to produce a PET fiber with a strength of 5.5 g/den, an elongation of 26%, and a fineness of 150 den. The polyester fiber was then subjected to a woven jacquard process to produce a jacquard woven fabric with a thickness of 0.26 mm, which was used as a woven layer.

A TPU film with the melting point of 108° C., the Shore A hardness of 60 A, and a thickness of 0.15 mm was provided and drilled the film with a hole diameter of 1.8 mm and a hole distribution density of 144 holes in 1 square inch to obtain a porous elastomer layer.

Another TPU ester pellets with the melting point of 160° C. and the Shore A hardness of 70 A were provided and subjected to a melt-blown process to blown the TPU fiber mesh onto the porous elastomer layer to form a nonwoven layer with a fiber mesh thickness of 0.35 mm.

The aforementioned nonwoven layer and the porous elastomer layer were stacked on the woven layer, and then the three stacked layers were passed through a hot press laminating machine with the hot press temperature of 110° C. to melt and bond the porous elastomer layer to the woven layer and the nonwoven layer to obtain a thin artificial leather structure with a thickness of 0.55 mm, which is breathable and has a micro touch surface.

Example 3

Polyester pellets with an intrinsic viscosity (IV) of 0.64 were provided and subjected to a melt-spinning and drawing process to produce a PET fiber with a strength of 5.2 g/den, an elongation of 24%, and a fineness of 150 den. The polyester fiber was then subjected to a circular knitting process to produce a circular knitted fabric with a thickness of 0.38 mm, which was used as a woven layer.

A TPU film with the melting point of 90° C., the Shore A hardness of 55 A, and a thickness of 0.1 mm was provided and drilled the film with a hole diameter of 2.2 mm and a hole distribution density of 144 holes in 1 square inch to obtain a porous elastomer layer.

TPU ester pellets with the melting point of 160° C. and the Shore A hardness of 70 A were provided and subjected to a melt-blown process to blown the TPU fiber mesh onto the porous elastomer layer to form a nonwoven layer with a fiber mesh thickness of 0.3 mm.

The aforementioned nonwoven layer and the porous elastomer layer were stacked on the woven layer, and then the three stacked layers were passed through a hot press laminating machine with the hot press temperature of 95° C. to melt and bond the porous elastomer layer to the woven layer and the nonwoven layer to obtain a thin artificial leather structure with a thickness of 0.58 mm, which is breathable and has a micro touch surface.

Example 4

PET filament with 150 den fineness was knitted into knitted fabric with a thickness of about 0.2 mm to 0.3 mm, and was used as a woven layer. A foamed thermoplastic polyurethane film with a thickness of about 0.4 mm to 0.5 mm was used as a porous elastomer layer. A melt-blown thermoplastic polyurethane non-woven layer with a thickness of about 0.2 mm to 0.4 mm was used as a nonwoven layer.

The aforementioned nonwoven layer and the porous elastomer layer were stacked on the woven layer, and then the three stacked layers were passed through a hot press laminating machine with the hot press temperature of 130° C. and the pressure of 20 kg/cm² to melt for 30 seconds and bond the porous elastomer layer to the woven layer and the nonwoven layer to obtain a thin artificial leather structure with a thickness of 1.0 mm to 1.2 mm, which is breathable.

Example 5

A PET filament with 300 den fineness was knitted into knitted fabric with a thickness of about 0.4 mm to 0.6 mm, and was used as a woven layer. A foamed thermoplastic polyurethane film with a thickness of about 0.4 mm to 0.5 mm was used as a porous elastomer layer. A melt-blown thermoplastic polyurethane non-woven layer with a thickness of about 0.2 mm to 0.4 mm was used as a nonwoven layer.

The aforementioned nonwoven layer and the porous elastomer layer were stacked on the woven layer, and then the three stacked layers were passed through a hot press laminating machine with the hot press temperature of 130° C. and pressure of 20 kg/cm² to melt for 30 seconds and bond the porous elastomer layer to the woven layer and the nonwoven layer to obtain a thin artificial leather structure with a thickness of 1.2 mm to 1.4 min, which is breathable.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale, There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt to a particular situation, material, composition of matter, method, or process in accordance with the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An artificial leather structure, comprising:
   a woven layer;
   a porous elastomer layer disposed on the woven layer and comprising a plurality of holes; and
   a nonwoven layer disposed on the porous elastomer layer;
   wherein the porous elastomer layer is adhered to the woven layer and the nonwoven layer;
   wherein the plurality of holes are columnar holes penetrating the porous elastomer layer but not penetrating through the woven layer or the nonwoven layer;
   wherein the material of the porous elastomer layer is thermoplastic polyurethane (TPU), the melting point of the porous elastomer layer is from about 90° C. to about 130° C., and the Shore A hardness of the porous elastomer layer is from about 45A to about 60A; and
   wherein the material of the nonwoven layer is TPU, the melting point of the nonwoven layer is from about 130° C. to about 190° C., and the Shore A hardness of the nonwoven layer is from about 50 A to about 80 A.

2. The artificial leather structure of claim 1, wherein the woven layer contains a plurality of fibers, and the plurality of fibers are gathered to form yarn or filaments, and meridian yarn or filaments and latitude yarn or filaments cross-pass each other.

3. The artificial leather structure of claim 1, wherein the woven layer contains a plurality of fibers, and the plurality of fibers are gathered to form yarn or filaments, and fiber-forming yarn or filaments form loops and the loops stack and entangle together.

4. The artificial leather structure of claim 1, wherein the fibers of the woven layer are filaments.

5. The artificial leather structure of claim 1, wherein the TPU is polyester-based TPUs derived from adipic acid esters, or polyether-based TPUs based on tetrahydrofuran ether.

6. The artificial leather structure of claim 1, wherein the plurality of holes are foam holes.

7. The artificial leather structure of claim 1, wherein the nonwoven layer is melt-blown nonwoven or spun-bonded nonwoven.

8. The artificial leather structure of claim 1, wherein the fineness of fiber of the nonwoven layer is less than 10 μm.

* * * * *